United States Patent

[11] 3,586,274

[72] Inventor Wayne H. Hart
 7342 Walnut Street, Buena Park, Calif. 90620
[21] Appl. No. 815,381
[22] Filed Apr. 11, 1969
[45] Patented June 22, 1971

[54] FISHING POLE SUPPORT
 2 Claims, 3 Drawing Figs.

[52] U.S. Cl. .................................................. 248/44,
 248/1, 248/156, 248/314
[51] Int. Cl. ...................................................... A01k 47/10,
 A01k 87/00
[50] Field of Search ......................................... 248/38, 39,
 40, 42, 43, 44, 156, 204, 302, 309, 33.6; 52/298

[56] References Cited
UNITED STATES PATENTS
965,826   6/1910  Lynch ........................... 248/38
1,608,795 11/1926 Kennedy ....................... 248/38
1,626,333  4/1927 Fain et al. ..................... 248/38
2,494,476  1/1950 Goetter ......................... 248/42

OTHER REFERENCES
POPULAR SCIENCE; August, 1960, page 119, Q1 P8

Primary Examiner—William H. Schultz
Attorney—Hinderstein & Silber

ABSTRACT: A fishing pole holder comprising an elongated rod, one portion of which is formed into a continuous series of coils, and the remainder of which forms a spike adapted to be inserted in the ground. The series of coils provides a generally cylindrical opening for receiving the handle of the fishing pole. The pole may be positioned at any one of an infinite number of angular positions by resting the base of the handle on different ones of the coils.

PATENTED JUN 22 1971

3,586,274

INVENTOR.
WAYNE H. HART

BY
Hinderstein & Silber
ATTORNEYS

FISHING POLE SUPPORT

BACKGROUND OF THE INVENTION

1. Field of the Invention

The present invention relates to a fishing pole support and, more particularly, to a one-piece fishing pole holder for supporting a fishing pole at any one of many possible angular positions without mechanical adjustment.

2. Description of the Prior Art

One of the basic items in a fisherman's tackle box is a fishing pole holder which is adapted to be inserted in the ground and to receive the handle of a fishing pole. Such a holder is necessary so that the fisherman does not have to constantly hold his pole, thereby freeing his hands for other tasks such as preparing bait, using another fishing pole, etc.

One common type of fishing pole holder consisting of a cylindrical cup, one end of which is open to receive the handle of the fishing pole and the other end of which is closed. Secured to the closed end is a spike which is adapted to be inserted into the ground. Although such a fishing pole holder performs the basic function required of it, it has several disadvantages. The most basic disadvantage is the fact that once the holder is inserted in the ground, it is only capable of supporting a fishing pole at a single angle. This undesirable since different circumstances require the fishing pole to be positioned at different angles. For example, when placing bait on the fishing pole line, it is desirable to support the fishing pole practically erect so that when the bait is released, it does not fall on the ground. On the other hand, once the line is cast into the water, it is desirable to be able to position the fishing pole at an acute angle to the ground so that the line enters the water as close to the fishing pole as possible. In addition, the presence of a prevailing wind may require an adjustment of the angle of the fishing pole so that it is not thrown from the holder. A similar adjustment may be required depending upon the nature of the fish being sought. With the cup-type fishing pole holder, the only way to make such adjustments is to remove the spike from the ground and reinsert it at the appropriate angle. This must often be done a number of times in spite of the fact that soil conditions may make the procedure difficult.

To solve this problem, some fishing pole holders have the body portion and the spike portion connected by a pivoting joint which is usually secured by a bolt and wingnut. However, since the adjustment of the angle of the holder requires loosening the wing nut, manipulating the body portion, and then retightening the wingnut, the tendency of most fishermen is to set the holder at a single position and then leave it there.

Another difficulty with some conventional fishing pole holders is that they are made of sheet metal and are, therefore, relatively weak. In addition, the size of conventional fishing pole holders usually prevents them from being stored in the fisherman's tackle box. On the other hand, in order to solve this particular problem, many fishing pole holders are made in several pieces so that they can be disassembled for storage. However, if one of the small pieces is lost, the entire holder is rendered useless. Finally, the enclosed holder of cup-type fishing pole supports usually becomes clogged with dirt and other debris since it is difficult, at best, to keep clean.

SUMMARY OF THE INVENTION

According to the present invention, these and other problems of the prior art are solved by providing a novel fishing pole holder. The present fishing pole holder is unique in that once inserted in the ground, it may be used to support a fishing pole at any one of an infinite number of angular positions without any mechanical adjustment. The present holder is made from a single, continuous piece of rodlike material which not only adds to the strength of the device but also eliminates small, loose pieces which are easily lost. The present holder will easily fit in all standard size tackle boxes and is essentially self-cleaning.

Briefly, the present fishing pole holder consists of an elongated rod, one portion of which is formed into a continuous series of coils or spiral portion, and the remainder of which forms a spike adapted to be inserted into the ground. The spiral portion provides a generally cylindrical opening for receiving the handle of the fishing pole. The holder may be used to support a fishing pole at any one of an infinite number of angular positions, since the base of the handle of the fishing pole may e rested on any one of the coils.

It is, therefore, an object of the present invention to provide a novel fishing pole holder.

It is a further object of the present invention to provide a unitary fishing pole holder consisting of a coil of rodlike material for supporting a fishing pole at any one of may possible angular positions.

It is a still further object of the present invention to provide a fishing pole holder that may be used to support a fishing pole at any one of an infinite number of angular positions without mechanical adjustment.

It is another object of the present invention to provide a one-piece fishing pole holder which may be placed in any conventional tackle box.

It is still another object of the present invention to provide a fishing pole holder which is essentially self-cleaning.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figures 1, 2, 3:
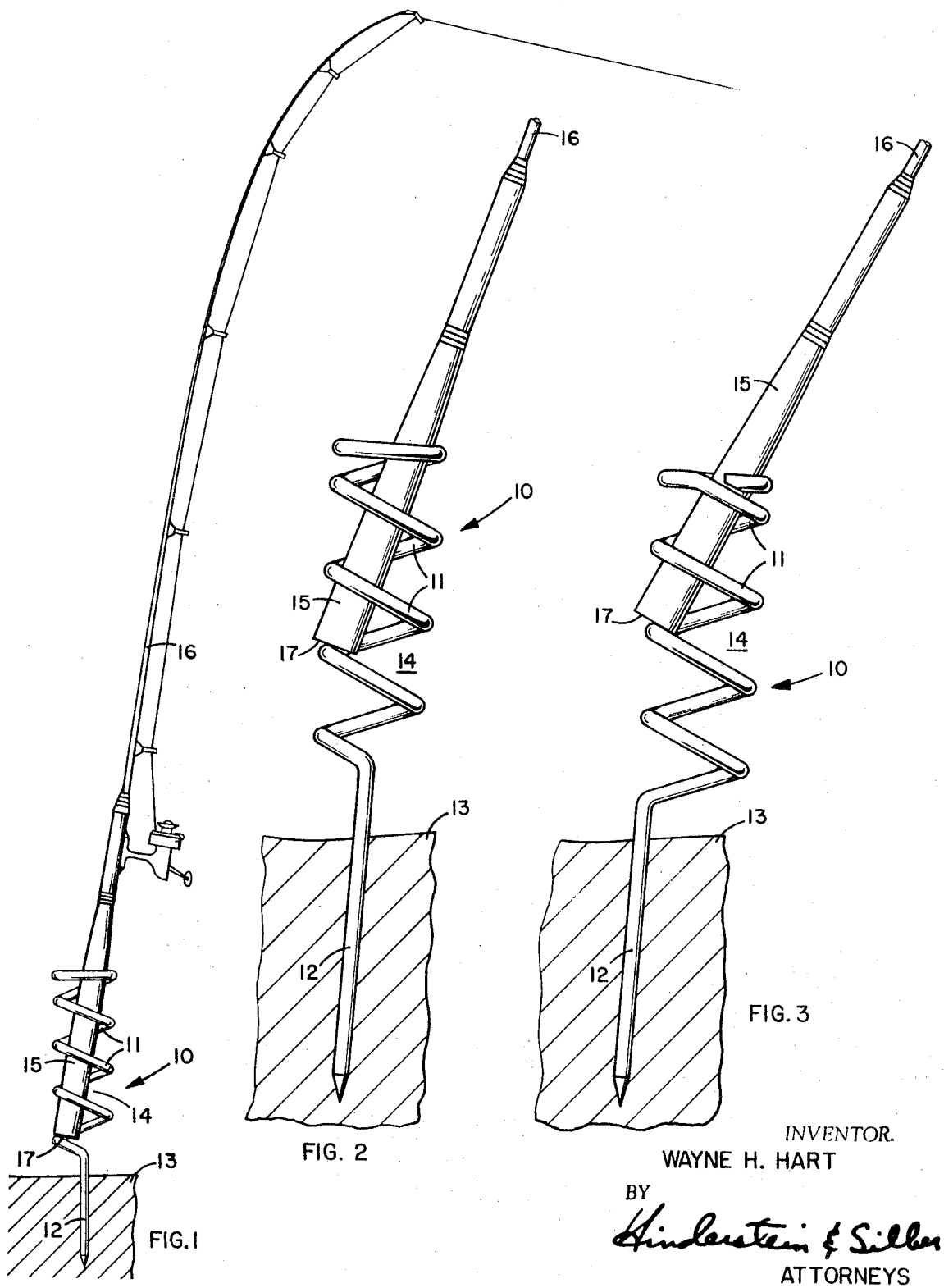
FIG. 1 is a side elevation view of the present fishing pole holder shown supporting a fishing pole.
FIGS. 2 and 3 are exploded views of the fishing pole holder of FIG. 1 showing the manner in which it may be used to support a fishing pole at any one of an infinite number of possible angular positions.

Referring now to the drawings, the present fishing pole holder, generally designated 10, is made up of a single, continuous, elongated piece of rodlike material, one portion of which is formed into a series of coils 11 so as to have a generally spiral configuration. The remainder of the rodlike material is straight and parallel to the axis of spiral 11 so as to form a spike 12 which is adapted to be inserted in the ground 13. Spiral portion 11 forms a generally cylindrical opening 14 which is adapted to receive a handle 15 of a fishing pole 16.

In operation, and as shown in FIG. 1, handle 15 of fishing pole 16 may be inserted into opening 14 in spiral portion 11 of holder 10 until the base 17 of handle 15 rests sn the lowermost coil 11. Under these circumstances, fishing pole 16 is in its most erect position which may be useful for baiting, etc. However, once the line is cast into the water, fishing pole 16 can be positioned at any angular position by resting base 17 of handle 15 on different ones of coils 11. Two possible examples are shown in FIGS. 2 and 3. In this manner, the number of angular positions possible for fishing pole 16 is truly infinite. Without rotating holder 10, fishing pole 16 may be positioned at a number of angular positions equal to the number of coils 11. However, by rotating holder 10, additional positions are possible.

Any number of coils 11 for fishing pole holder 10 is possible. It has been found that four or five coils are suitable for practically all shapes of fishing pole handles. the inside diameter of coils 11 may have any value but is preferably within the range of 1 to 2 inches. The length of spiral portion 11 of holder 10 may also have any length, although if made too long, it may interfere with the fishing pole reel. A preferred length is anywhere between 5 and 9 inches, although it can be made longer for salt water rods where the distance between the base of the handle and the reel is 12 inches or more.

The advantages derived from fishing pole holder 10 should now be obvious. In addition to the fact that it is capable of supporting a fishing pole at any one of an infinite number of possible angular positions none of the disadvantages of previous holders are present. More specifically, since the present holder is typically made from durable, smooth, rodlike steel, it is substantially stronger than most other holders. In addition, holder 10 has no loose pieces, and is small enough to fit in any standard tackle box. Finally, due to the generally open construction of holder 10, there are no places for dirt and other debris to accumulate making holder 10 essentially self-cleaning.

While the invention has been described with respect to a preferred physical embodiment constructed in accordance therewith, it will be apparent to those skilled in the art that various modifications and improvements may be made without departing from the scope and spirit of the invention.

I claim:

1. A fishing pole holder comprising:
   means for supporting a fishing pole at any one of many possible angular pole positions, said means comprising:
   an elongated rod formed into a continuous series of coils with a space between each coil, the inside diameter of said coils being within the range of from approximately 1 inch to approximately 2 inches, said space between each coil being greater than 1 inch, said series of coils forming a generally cylindrical opening adapted to receive the handle of a fishing pole, the base of said handle adapted to rest on any one of said coils; and
   means for securing said supporting means to the ground, said securing means comprising:
   an elongated rod connected to one end of said series of coils.

2. A method for supporting a fishing pole at any one of many possible angular pole positions comprising the steps of:
   forming a first portion of an elongated rod into a continuous series of coils with a space between each coil;
   inserting the remainder of said elongated rod into the ground;
   positioning the handle of a fishing pole within the space encircled by said coils; and
   resting the base of said handle on different ones of said coils according to the desired angular position of said fishing pole.